United States Patent
Låks et al.

(10) Patent No.: US 9,169,031 B2
(45) Date of Patent: Oct. 27, 2015

(54) AERIAL VEHICLE HOLD-DOWN HARPOON

(75) Inventors: Emil Låks, Ödeshög (SE); Gustaf Losand, Linköping (SE)

(73) Assignee: SAAB AB, Linkoeping (SE)

( * ) Notice: Subject to any disclaimer, the term of this patent is extended or adjusted under 35 U.S.C. 154(b) by 195 days.

(21) Appl. No.: 14/007,867

(22) PCT Filed: Mar. 31, 2011

(86) PCT No.: PCT/SE2011/050371
§ 371 (c)(1),
(2), (4) Date: Nov. 1, 2013

(87) PCT Pub. No.: WO2012/134365
PCT Pub. Date: Oct. 4, 2012

(65) Prior Publication Data
US 2014/0291442 A1    Oct. 2, 2014

(51) Int. Cl.
*B64C 25/32*    (2006.01)
*B64F 1/16*    (2006.01)
*B64F 1/12*    (2006.01)
*B64C 25/52*    (2006.01)

(52) U.S. Cl.
CPC . *B64F 1/16* (2013.01); *B64C 25/52* (2013.01); *B64F 1/125* (2013.01); *B64C 2025/325* (2013.01)

(58) Field of Classification Search
CPC ........ B64C 25/02; B64C 25/52; B64C 25/53; B64C 25/68
USPC ....................................................... 244/115
See application file for complete search history.

(56) References Cited

U.S. PATENT DOCUMENTS 3,151,826 A * 10/1964 Michel .......................... 244/115
5,092,540 A * 3/1992 Burgess et al. ............ 244/110 F
(Continued)

FOREIGN PATENT DOCUMENTS

| | | |
|---|---|---|
| FR | 1253269 A | 1/1961 |
| GB | 923864 | 4/1963 |

(Continued)

OTHER PUBLICATIONS

International Searching Authority, International Search Report and Written Opinion for International Application No. PCT/SE2011/050371, Nov. 25, 2011, 12 pages, Swedish Patent and Registration Office, Stockholm.

(Continued)

*Primary Examiner* — Justin Benedik
(74) *Attorney, Agent, or Firm* — Alston & Bird LLP

(57) ABSTRACT

The present invention regards an aerial vehicle harpoon device for securing an aerial vehicle (31, 55) to a grid (9) of a landing site, the aerial vehicle (31, 55) comprises an undercarriage (11) having a supporting surface (13) for supporting the aerial vehicle (31, 55) when being in contact with the ground (15), the harpoon device (1) further comprises a securing element (4) arranged adjacent the supporting surface (13). The harpoon device (1) further comprises a resilient actuating device (23) which is adapted to extend the securing element (4) beyond the supporting surface (13) in an unloaded state, and which in a loaded state is compressed by the weight of the aerial vehicle (31, 55) when contacting the ground (15) so that the securing element (4) retracts and the supporting surface (13) contacts the ground (15).

12 Claims, 4 Drawing Sheets

(56) References Cited

U.S. PATENT DOCUMENTS

| | | | |
|---|---|---|---|
| 5,480,108 A | * | 1/1996 | Amiand et al. ............... 244/115 |
| 2005/0269450 A1 | * | 12/2005 | Muylaert et al. ........... 244/118.1 |

FOREIGN PATENT DOCUMENTS

| | | |
|---|---|---|
| GB | 930794 | 7/1963 |
| WO | WO 90-13480 A1 | 11/1990 |

OTHER PUBLICATIONS

Zacco Sweden AB, PCT Demand for International Preliminary Examination: Applicant's Response to Written Opinion dated Nov. 25, 2011 for International Application No. PCT/SE2011/050371, Dec. 20, 2012, 14 pages.

International Preliminary Examining Authority, Second Written Opinion for International Application No. PCT/SE2011/050371, mailed Mar. 28, 2013, 4 pages, Swedish Patent and Registration Office, Stockholm.

International Preliminary Examing Authority, International Preliminary Report on Patentability for International Application No. PCT/SE2011/050371, completed Aug. 6, 2013, 7 pages, Swedish Patent and Registration Office, Stockholm.

European Patent Office, Extended European Search Report for Application No. 11861914.7, May 27, 2015, 6 pages, Germany.

* cited by examiner

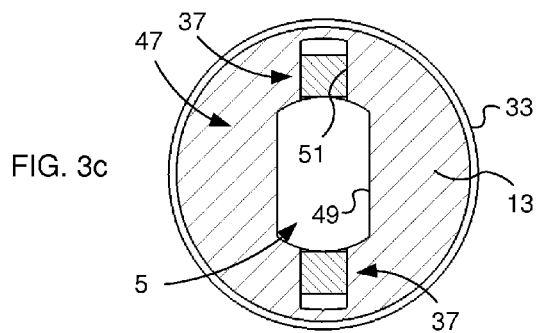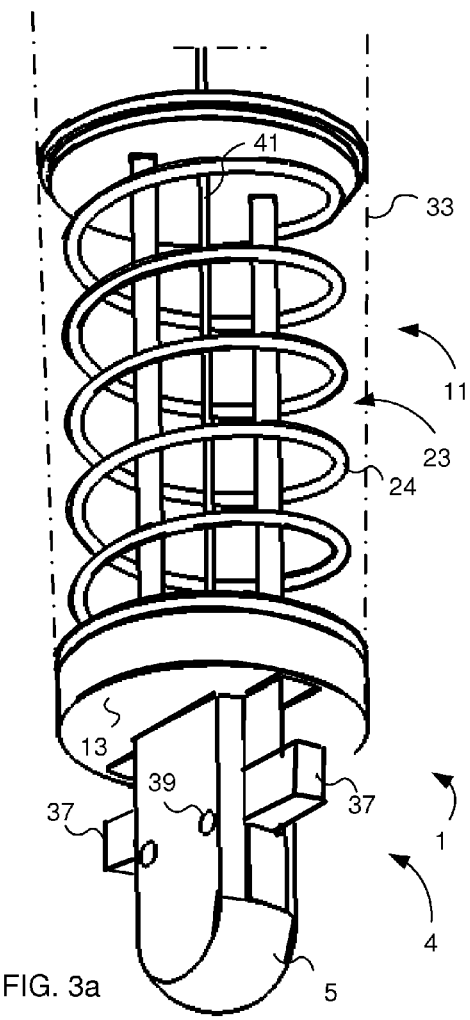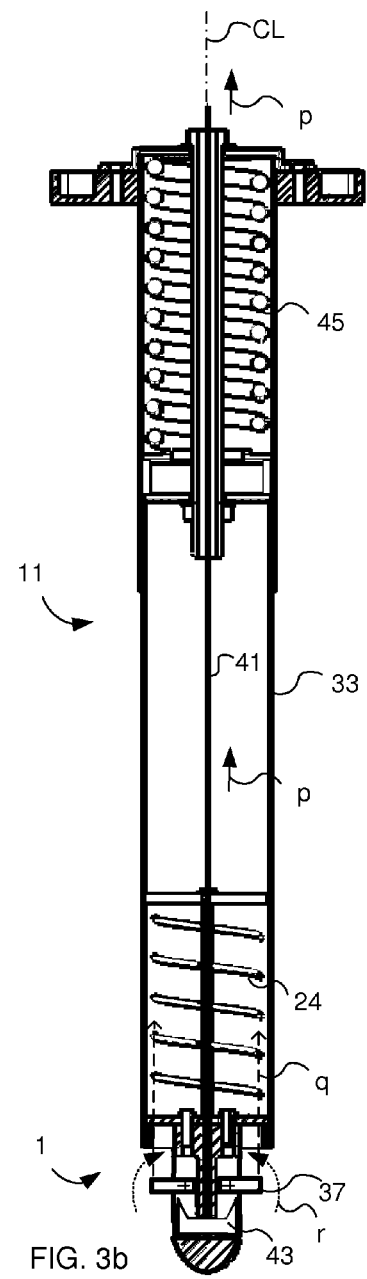

AERIAL VEHICLE HOLD-DOWN HARPOON

CROSS REFERENCE TO RELATED APPLICATIONS

This application is a national stage application, filed under 35 U.S.C. §371, of International Application No. PCT/SE2011/050371, filed Mar. 31, 2011, the contents of which is hereby incorporated by reference in their entirety.

BACKGROUND

1. Related Field

The present invention relates to a hold-down harpoon device according to the preamble of claim 1.

The invention can be applied in aircraft industry, for UAV manufacture, or helicopter manufacture et., but is not limited to these.

2. Description of Related Art

Aerial vehicles, such as remotely piloted aircrafts and helicopters, or so called unmanned aerial vehicles UAV, or manned VTOL aircrafts or helicopters etc., are for certain applications equipped with capturing and/or securing devices for securing the vehicle to a platform grid.

Efforts have been made to improve known devices. For example U.S. Pat. No. 5,092,540 shows a device having a probe with engagement wings for securing the aircraft to a landing platform mesh, wherein the wings engage the mesh. The probe has a sufficient length to pass through the aperture of the mesh or grid, so that the wings can engage the mesh. In GB 923 864 is disclosed an aircraft ground handling device for securing an aircraft to a platform by means of a harpoon device.

It is desirable to provide an aerial vehicle with an undercarriage and a harpoon device, which harpoon device and undercarriage are not bulky for providing sufficient space under the aerial vehicle to be occupied by various equipments, such as antennas, weapons etc.

It is also desirable to provide an integrated undercarriage and harpoon device, which has as low weight as possible and which does not comprise superfluous operating mechanisms.

An object is to design an undercarriage and harpoon device of an aerial vehicle, which harpoon device provides for a secure landing in case of emergency and energy supply failure of the aerial vehicle.

A further object is also to eliminate drawbacks of known techniques, develop them and improve the prior art harpoon devices for aerial vehicles.

BRIEF SUMMARY

This has been solved by the system as defined in the introduction and characterized by the features of the characterizing part of claim 1.

In such way the aerial vehicle can land on a hard surface, wherein the harpoon device automatically retracts within the undercarriage or landing gear without any extra mechanism to retract the harpoon device. The harpoon device can preferably be an integrated part of the undercarriage. Thereby a low weight is achieved at the same time as the automatic retraction functionality is provided. In case of emergency landing and in event of lack of energy supply in the aerial vehicle, the automatic retraction functionality still will work and the supporting surface of the undercarriage will establish contact with the ground instead of the harpoon device contacting the ground. The harpoon device's securing element will thus automatically retract into the undercarriage when the securing element touches the ground and the latter pushes the securing element into the undercarriage, wherein the undercarriage's supporting surface will act in a safe manner relative the ground surface. This promotes for a secure emergency landing. Preferably, when the aerial vehicle has landed on the grid and the harpoon device is engaged to the grid, the extension of the securing elements can be decreased by pushing the securing elements together so that the harpoon device can pass through the engaged orifice of the grid and the aerial vehicle can be released. Suitable, a plate is placed by service personnel between the aerial vehicle and the grid, wherein the harpoon device will be pushed into the undercarriage or landing leg due to the weight of the aerial vehicle and the supporting surface will thus be in contact with the plate. The aerial vehicle is thereby ready to take off.

Preferably, the securing element is arranged to be able to be encompassed within the undercarriage.

Thereby is achieved an undercarriage that encompasses the harpoon device, wherein the air resistance is as low as possible, which is energy saving, at the same time as the automatic retraction function is achieved.

Suitably, the undercarriage is hollow to encompass the resilient actuating device.

In such a way is achieved that the undercarriage is as compact as possible, still including the harpoon functionality.

Preferably, the resilient actuating device comprises a compression spring.

Thereby a simple design is achieved of the harpoon device, which is cost-effective to produce and fail-safe during operation. The spring can be made of steel or composite plastic.

Suitably, the resilient actuating device is an elastic polymeric body.

Preferably, the supporting surface of the undercarriage is made of rubber.

In such way a dampening and braking action of the aerial vehicle is achieved when it touches down on a hard landing surface. The resilient actuating device or compression spring, which extends the securing element beyond the supporting surface in an unloaded state, will be compressed by the weight of the aerial vehicle when contacting the ground so that the securing element retracts and the supporting surface of the undercarriage contacts the ground. The compression force sufficient to retract the securing element can also be made by means of the force affecting the harpoon device which force is due by the ground when the aircraft lands on a hard ground surface.

Suitably, the undercarriage comprises two hollow elongated bodies arranged slidable relatively each other for making a suspension unit.

Thereby the undercarriage per se is made with suspension functionality at the same time as the harpoon device is integrated in the undercarriage in an effective manner. Suitably, a second compression spring is arranged for making a dampening function and resilient character of the two interacting hollow elongated bodies.

Preferably, the securing element comprises a probe means including a hook element adapted to engage the grid.

In such a way is achieved that the hook element, such as two opposite arranged wings, can engage the underside of the grid. Preferably, the wings extend perpendicular to the centre line. The centre line is defined as a line extending in a direction corresponding with the prolongation of the harpoon device and which line corresponds with the direction of movement when the securing element retracts. Preferably, the number of wings is four.

Suitably, the securing element includes hook element which projects as far as possible from a probe means of the securing element, which probe means is designed to enter the engagement orifice of the grid, so that the hook element snaps into engagement with the grid. The extension of said projection from the probe external surface has a length that is sufficient to engage the grid, but that is short enough to be encompassed within the undercarriage or leg without the need of retracting the hook element into the probe means.

Thereby the securing element can be retracted into the undercarriage without any retraction of the hook element into the probe means. This will further promote for a simple design, which has an automatic function. That means, for example, that two opposite situated hooks or wings will present a transverse extension relative the centre line of the probe which is less than the interior diameter of the undercarriage or landing leg.

Suitably, the hook element comprises a pair of opposite situated wings which are hingedly connected to and retractable within the probe means for release of the aerial vehicle from the grid.

The wings are preferably spring loaded so that they tend to be extended from the probe in an active state. In such way the wings can be pushed into the probe and then spring back to the active state, without any mechanism for operating the wings to the active state.

Preferably, the hook element is retractable within the probe means by an operating member extending through the undercarriage.

Thereby is achieved that the wings can be pushed or drawn into the probe in an easy way for releasing the aerial vehicle from the grid.

Alternatively, the harpoon device and the undercarriage have no operating member for retracting the hook element. In such case, service personal will use a tool for moving the hook element into the probe, wherein it is possible to release the probe from the grid.

Suitably, the undercarriage comprises the harpoon device according to the above mentioned features.

In such a way is provided an undercarriage which has a securing and holding functionality at the same time as the undercarriage operates automatically regardless whether the aerial vehicle lands on a grid or on a hard ground surface.

Preferably, the undercarriage is an elongated landing strut or landing leg and is a part of an aerial vehicle's main undercarriage.

Alternatively, an angle between the centre line of the undercarriage and the prolongation of a hook element of the securing element is about 15-25 degrees, preferably 10-30 degrees, which centre line is oriented substantially perpendicular to the ground during said contact with the ground and when the hook element is extended for said securing of the arial vehicle.

Thereby is a rigid securing element achieved which has a high strength due to the inclined hook elements or jaws.

Suitable, the aerial vehicle is an unmanned aerial vehicle, such as an UAV helicopter. Preferably, the aerial vehicle is a helicopter adapted for offshore operation where the helicopter lands offshore on a grid and on hard landing surfaces of the mainland.

BRIEF DESCRIPTION OF THE FIGURES

The present invention will now be described by way of examples with references to the accompanying schematic drawings, of which:

FIG. 3a schematically illustrates in a perspective view a portion of a harpoon device according to the second embodiment;

FIG. 3b schematically illustrates in a cross-sectional view the harpoon device in FIG. 3a, wherein the landing leg per se is arranged with a suspension functionality;

FIG. 3c schematically illustrates from below the end of the landing leg in FIG. 3b;

DETAILED DESCRIPTION OF VARIOUS EMBODIMENTS

Hereinafter, embodiments of the present invention will be described in detail with reference to the accompanying drawings, wherein for the sake of clarity and understanding of the invention some details of no importance are deleted from the drawings.

Figure 1:
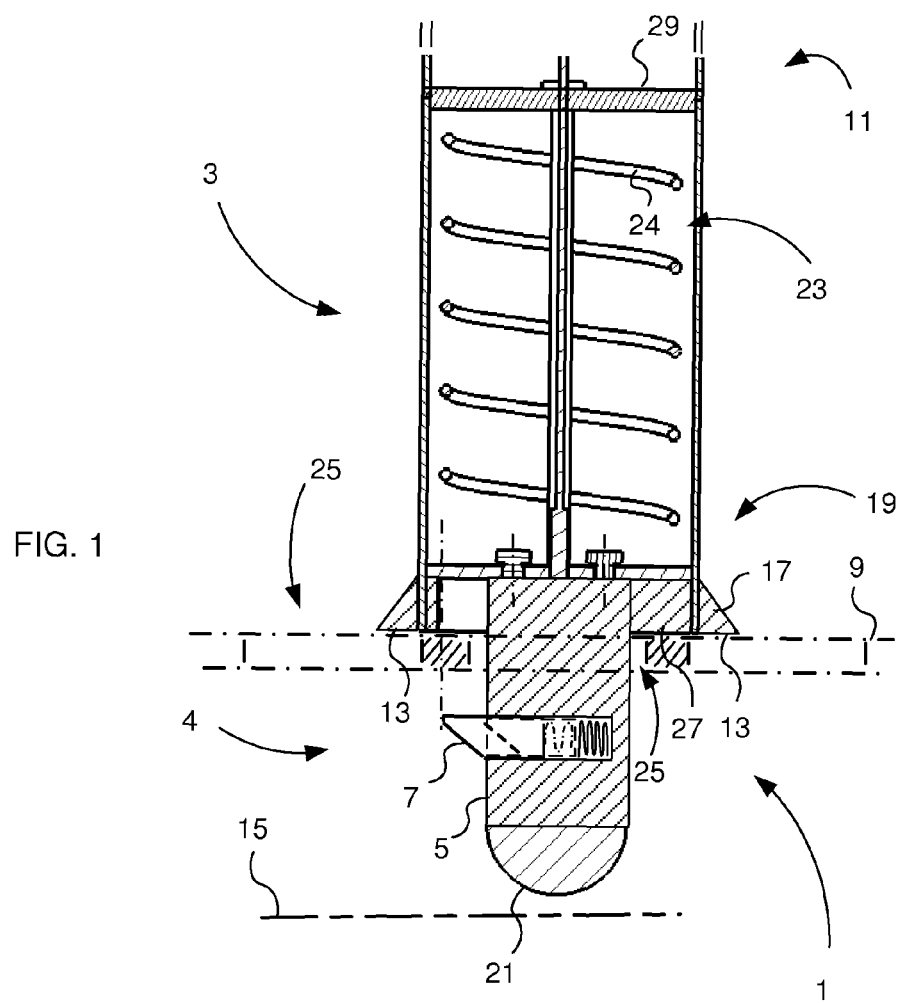
FIG. 1 schematically illustrates a harpoon device of a landing strut with a probe comprising a lock pin.

FIG. 1 schematically illustrates an aerial vehicle harpoon device 1 of a landing strut 3 comprising a securing element 4 including a probe 5 and a lock pin 7 of a hook element 8. The harpoon device 1 is provided for securing an aerial vehicle (not shown) to a grid 9 of a landing site. The aerial vehicle comprises an undercarriage 11 (partially shown) including a supporting surface 13 for supporting the aerial vehicle when it is in contact with the ground 15. The supporting surface 13 is defined by a rubber ring 17 attached around the outer end 19 of the landing strut 3. The securing element 4 is arranged adjacent the supporting surface 13. The probe 5 is designed as a cylinder 20 having a semi-spherical end 21. The lock pin 7 is bevelled and is displaceable arranged within the cylinder 20. It is furthermore spring loaded towards an extended state (marked with unbroken line) for an engagement with the grid 9. The harpoon device 1 further comprises a resilient actuating device 23 comprising a compression spring 24 of composite plastic, which spring 24 is adapted to extend the securing element 4 beyond the supporting surface 13 of the undercarriage 11 in an unloaded state (as shown in FIG. 1). The resilient actuating device 23 is in a loaded state compressed by the weight of the aerial vehicle when contacting the ground 15, so that the securing element 4 retracts into the landing strut 3 and wherein the supporting surface 13 contacts the ground 15 for a safe landing. This function will be further explained with regard to FIGS. 4a-4h below.

The grid 9 is made of a plastic sheet comprising a plurality of orifices 25. Each orifice 25 is capable to receive the semi-spherical end 21 and a portion of the cylinder 20 of the probe 5, so that the bevelled lock pin 7 will snap in and catch the grid 9. The undercarriage 11 is hollow to encompass the compression spring 24 whereby it is achieved that the undercarriage 11 can be made as compact as possible, still including the harpoon functionality.

The probe 5 and the bevelled lock pin 7 are mounted on a circular plate 27 which is slidable within the landing strut 3. The landing strut 3 is made with a cylindrical cross section for encompassing the plate 27. A fixed holder 29 is attached within the landing strut 3 for holding the compression spring 24. When the aerial vehicle lands on the hard ground 15 surface, the probe 5 will be pushed into the landing strut 3 due to the fact that the force generated by the weight of the aerial vehicle affecting this landing strut 3 is larger than the spring force of the compression spring 24. The bevelled lock pin 7 has an extending length from the outer surface of the probe 5 (in said extended state of the lock pin 7 which is spring loaded by spring 30) not longer than it can pass within the wall of the hollow landing strut 3, without the need of retracting the lock pin 7 into the probe 5. The retraction of the probe will thus be fail safe and will be performed automatically.

Thereby is also achieved that the undercarriage 11 will enclose the harpoon device 1, whereby the air resistance is as low as possible, which is energy saving, at the same time as the automatic retraction function is achieved.

By means of the rubber ring 17 a dampening and braking action of aerial vehicle is achieved when it touches down on a hard landing ground 15 surface, wherein at the same time the retraction of the securing element 4 is performed automatically and the probe 5 will not hook to any object of the hard landing ground surface, which otherwise could hazard the landing procedure. The resilient actuating device 23 or compression spring 24, which extends the securing element 4 beyond the supporting surface 13 in an unloaded state, will be compressed by the weight of the aerial vehicle when contacting the ground 15 so that the securing element 4 retracts into the landing strut 3 and the supporting surface 13 of the undercarriage 11 (landing strut) contacts the ground 15.

Figure 2:
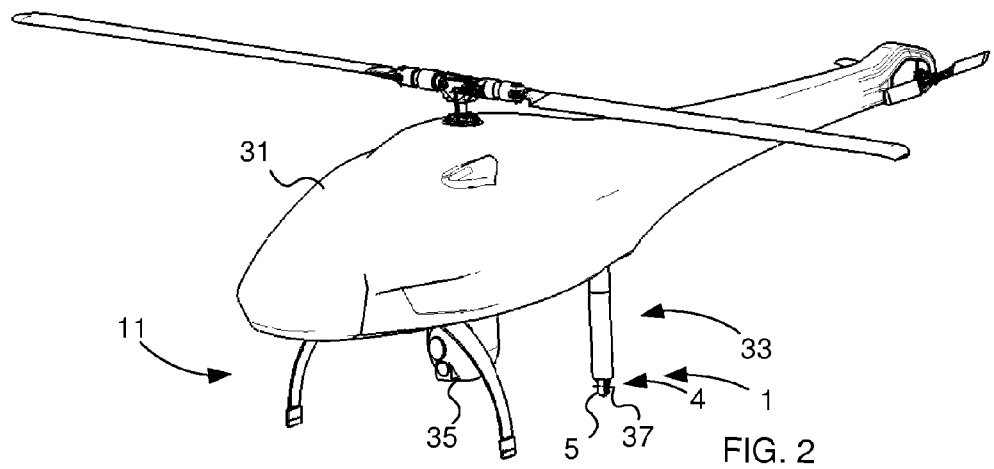
FIG. 2 schematically illustrates in a perspective view an unmanned aerial vehicle, UAV, comprising a rear landing leg having a harpoon device of a second embodiment.

FIG. 2 schematically illustrates in a perspective view a UAV 31 comprising a rear landing leg 33 comprising a harpoon device 1 according to a second embodiment. The rear landing leg 33 is a part of the UAV's 31 complete landing undercarriage 11. This embodiment of the harpoon device 1 is described further below with regard to FIGS. 3a-3c. The UAV 31 comprises a sight 35 mounted between the landing legs of the UAV 31. The FIG. 2 shows the harpoon device 1 in a state ready to hook in a grid (not shown). In such way is provided that the undercarriage 11, which has a securing and holding functionality, at the same time can function with an automatically retraction of the securing element 4 regardless whether the UAV 31 lands on a grid or on a hard ground surface.

FIGS. 3a-3c schematically illustrate a harpoon device 1 according to the second embodiment shown in FIG. 2. The landing leg 33 per se is arranged with suspension functionality. FIG. 3a illustrates a perspective view showing the interior of the landing leg 33. The securing element 4 comprises a probe 5 having two opposite situated wings 37. The wings 37 are designed to engage the underside of a grid (not shown). The wings 37 extend perpendicular to the centre line CL, which is defined as a line extending in a direction corresponding with the prolongation of the harpoon device 1 and the landing leg 33 and which line corresponds with the direction of movement of the securing element 4 within the landing leg 33 (see FIG. 3b). Each wing 37 is hingedly connected to the probe 5 via a pivot pin 39. Each wing 37 is spring loaded and urged into the extended position. The wings 37 thus tend to be extended from the probe 5 in an active state. When the aerial vehicle lands on a grid and the probe 5 enters one of the orifices of the grid, the wings 37 will hit the edge of the orifice and thus pivot in an upward direction into the probe 5 whereby the major part of the probe 5 can enter the orifice. As the wings 37 have passed the edge of the grid forming the orifice, they will be released and pivot back to the spring loaded perpendicular position for engagement with the grid. This hinders the probe 5 from come off the grid. The wings 37 are retractable within the probe 5 by an operating member, a wire 41, extending through the undercarriage 11. The wire 41 is coupled to a pusher 43 (see FIG. 3b) for pressing the wings 37 upwards so that they pivot into the retracted position. The other end of the wire 41 has a handle (not shown). Service personnel can thus easy pull the handle for retraction of the wings 37, whereby the aerial vehicle can be released from the grid.

FIG. 3b illustrates schematically the landing leg 33 in a cross-sectional view. The undercarriage 11 or landing leg comprises two hollow elongated cylindrical bodies 33', 33", which are arranged slidable relatively each other for making a suspension unit. That is, the landing leg 33 is also designed with spring functionality for achieving a smooth landing of the aerial vehicle. The undercarriage 11 is thereby designed with suspension functionality at the same time as the harpoon device 1 is an integrated part of the undercarriage 11. A further compression spring 45 is arranged between the two interacting hollow elongated cylindrical bodies 33', 33" for achieving a resilient function of the landing leg 33.

FIG. 3c illustrates an end plate 47 of the landing leg 33, which end plate 47 comprises a bore 49 through which the probe 5 is designed to pass. The end plate 47 comprises a supporting surface 13 for supporting the aerial vehicle against the ground surface when being in contact with the ground. The end plate 47 furthermore comprises recesses 51 made in the bore 49, through which recesses 51 the wings 37 can pass when the securing element 4 is pushed by the ground into the interior of the landing leg 33.

Figure 4A:
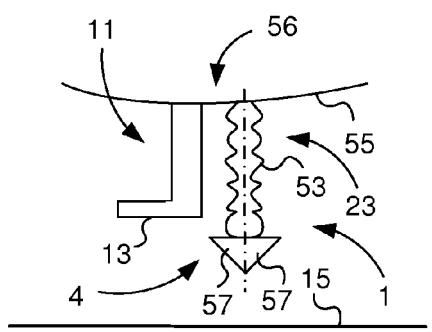
FIGS. 4a-4h schematically illustrate a third embodiment of the harpoon device and undercarriage as an integrated unit.
Figure 4B:
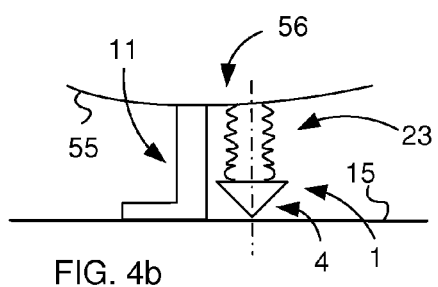
Figure 4C:
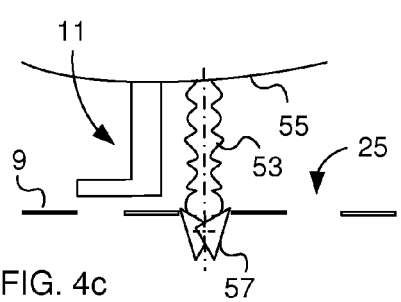
Figure 4D:
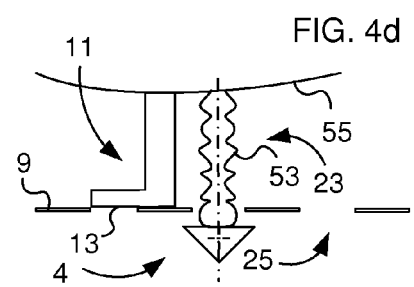
Figure 4E:
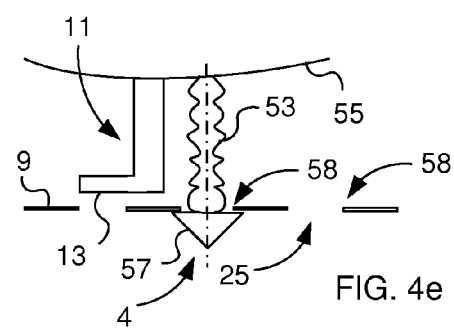
Figure 4F:
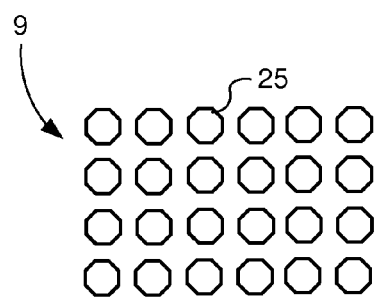
Figure 4G:
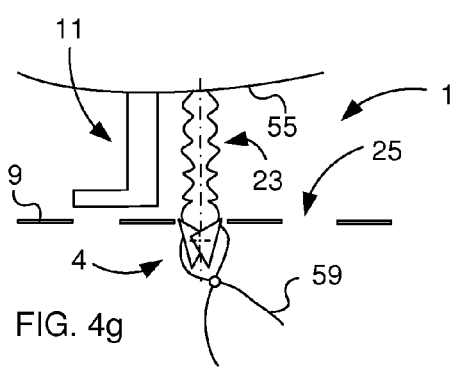
Figure 4H:
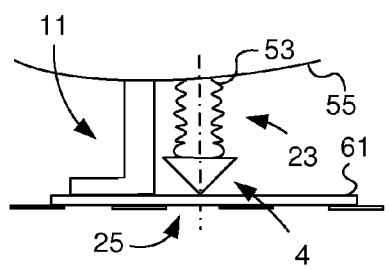

FIGS. 4a-4h schematically illustrate a third embodiment of a harpoon device 1 and undercarriage 11. The harpoon device 1 and the undercarriage 11 should be defined as an integrated unit 56. The resilient actuating device 23 constitutes an elastic polymeric body 53 which is adapted to extend a securing element 4 beyond the supporting surface 13 of the undercarriage 11 in an unloaded state. The definition of the word "beyond" in this context means that the securing element 4 is positioned further away from the aircraft 55 body than the supporting surface 13, so that the securing element 4 at first reaches the grid 9 (see FIG. 4c). The securing element 4 is made of two triangular pivotable plates 57 and is arranged adjacent the supporting surface 13. The triangular plates 57 are spring biased for reaching the extended position of the plates. In FIG. 4b is shown when the aircraft 55 has landed on hard ground and the undercarriage 11 has reached the ground 15 surface and the securing element 4 automatically has been retracted by compression of the elastic polymeric body 53. This so called loaded state means that the elastic polymeric body 53 has been compressed by the weight of the aircraft 55 when contacting the ground 15. Thereby the securing element 4 automatically retracts and the supporting surface 13 contacts the ground 15. In FIG. 4c is shown when the aircraft 55 lands on a capturing grid 9 (see also FIG. 4f illustrating the grid 9 from above). The securing element 4 will find, due to its arc shaped appearance, an orifice 25 of the grid 9 and enters through the orifice 25 by folding together the triangular plates 57 to such extent that they can pass the orifice 25. Thereafter the triangular plates 57 will be spring biased back to the extended position which is shown in FIG. 4d. Thereby the aircraft 55 is captured and locked to the grid 9. In case of the aircraft 55 tends to turn over due to a gust of wind, the securing element 4 will engage the underside of the grid 9 in the area of the edge 58 of the orifice 25 whereby the aircraft will remain on the grid 9, as is shown in FIG. 4e. The harpoon device 1 and undercarriage 11 comprises no integrated operating member for folding together the triangular plates 57. Service personnel (not being shown) uses a tool 59, which reminds of large pincers (see FIG. 4g), for pushing the triangular plates 57 towards each other, wherein it will be possible to release the securing element 4 from the grid 9 so that the aircraft 55 can be released. Thereafter, service personnel arrange a plate 61 (see FIG. 4h) between the aircraft 55 and the grid 9, that is under the undercarriage 11 and the harpoon device 1, whereby the harpoon device's 1 securing element 4 automatically will retract by compression of the elastic polymeric body 53 of the harpoon device 1. This retraction will be due by means of the weight (or partial weight) of the aircraft. The supporting surface 13 will thus be in contact with the plate 61 and the aircraft 55 is ready to take off.

Figure 5B:
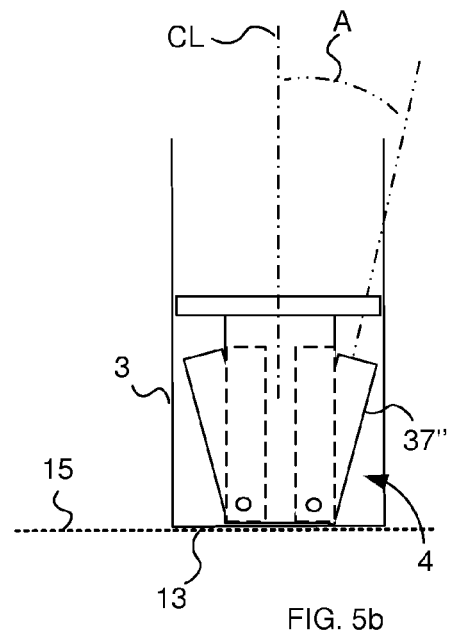
FIGS. 5a-5c schematically illustrate a fourth embodiment having oblique jaws relative the centre line for achieving a rigid securing element.
Figure 5A:
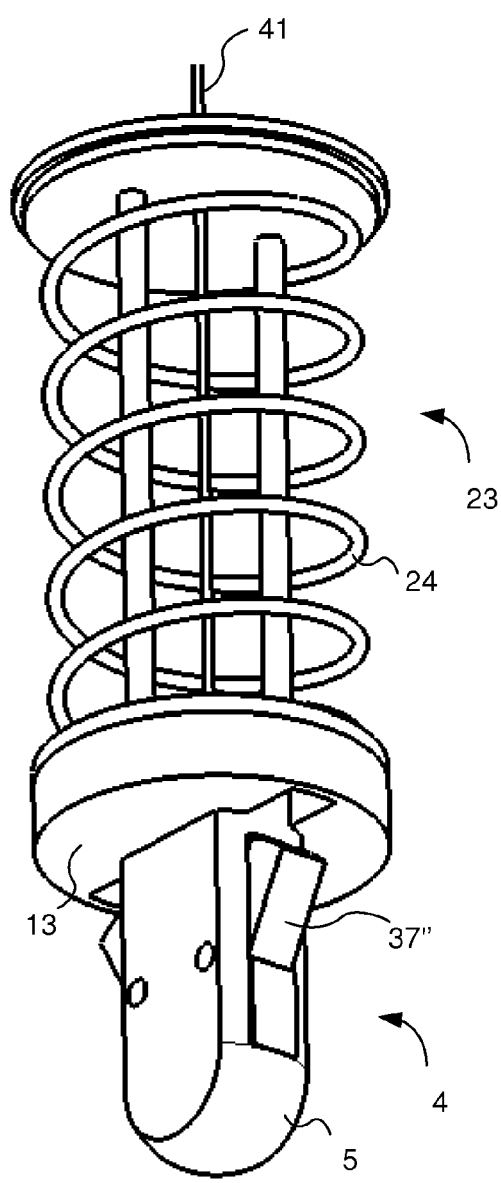
Figure 5C:
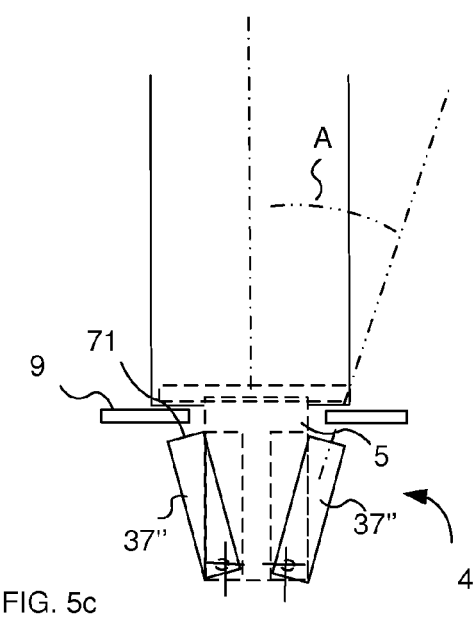

FIGS. 5a-5c schematically illustrate a fourth embodiment having oblique jaws 37" relative the centre line CL for achieving a rigid securing element 4. In FIG. 5b is shown the landing strut 3 standing on the solid ground 15, wherein the whole securing element has been pushed into the landing strut 3, so that the supporting surface is in full contact with the ground 15 surface. The jaws 37" are spring loaded and fold out from the probe 5 also when the securing element 4 is pushed into the landing strut 3. The interior of the landing strut 3 is provided in such way for encompassing the fold out jaws 37". In FIG. 5c is shown the landing strut 3 standing on a grid or on the bridges between the orifices, one of which the probe 5 has entered. The jaws 37", as they are spring loaded, are pushed into the probe, when the probe 5 enters said orifice of the grid 9 and the jaws 37" hit the edges of the bridges between the orifices. Thereafter when the probe 5 is further down and below the grid 9, the jaws 37" spring back to the extended position. An end surface 71 of respective jaw 37" is provided for acting as a stop surface and hinders the probe 5 and thus the UAV from leaving the grid 9. The respective jaw is pivotable about a pivot point. An angle A between the centre line CL and the prolongation of the respective jaw is about 15-25 degrees, preferably 10-30 degrees. In such way the moment distribution will be as low as possible about the pivot point whereby the strength of the assembly is satisfactory.

The present invention is of course not in any way restricted to the preferred embodiments described above, but many possibilities to modifications, or combinations of the described embodiments thereof, should be apparent to a person with ordinary skill in the art without departing from the basic idea of the invention as defined in the appended claims. For example, the landing undercarriage can have different designs. It can be rectangular, triangular, oval etc. in cross-section. The resilient actuating device can be an elongated pneumatic or hydraulic actuator or absorber. The undercarriage can comprise a landing skid, landing gear, floats etc. The securing element's lock pins, hooks, wings, jaws etc. may have various designs, such as rounded, arrow shaped, curved etc.

The invention claimed is:

1. An aerial vehicle harpoon device for securing an aerial vehicle (31, 55) to a grid (9) of a landing site, the aerial vehicle (31, 55) comprises an undercarriage (11) having a supporting surface (13) for supporting the aerial vehicle (31, 55) when being in contact with the ground (15), the harpoon device (1) further comprises a securing element (4) arranged adjacent the supporting surface (13) for said securing of the aerial vehicle, wherein the harpoon device (1) further comprises a resilient actuating device (23) which is adapted to extend the securing element (4) beyond the supporting surface (13) in an unloaded state, when the aerial vehicle has landed and the harpoon device (1) is engaged to the grid (9), and which resilient actuating device (23) in a loaded state is compressed by the weight of the aerial vehicle (31, 55) when contacting the ground (15) so that the securing element (4) retracts and the supporting surface (13) contacts the ground (15).

2. The harpoon device according to claim 1, wherein the securing element (4) is arranged to be able to be encompassed within the undercarriage (11).

3. The harpoon device according to claim 1, wherein the undercarriage (11) is hollow to encompass the resilient actuating device (23).

4. The harpoon device according to claim 1, wherein the resilient actuating device comprises a compression spring (24).

5. The harpoon device according to claim 1, wherein the resilient actuating device is an elastic polymeric body (53).

6. The harpoon device according to claim 1, wherein the supporting surface (13) of the undercarriage is made of rubber.

7. The harpoon device according to claim 1, wherein the undercarriage (11) comprises two hollow elongated bodies (33', 33") arranged slidable relatively each other for making a suspension unit.

8. The harpoon device according to claim 1, wherein the securing element (4) comprises a probe means (5) including a hook element (7, 37, 37", 57) adapted to engage the grid (9).

9. The harpoon device according to claim 8, wherein the hook element comprises a pair of opposite situated wings (37, 37") which are hingedly connected to and retractable within the probe means (5) for release of the aerial vehicle (31, 55) from the grid (9).

10. The harpoon device according to claim 9, wherein the hook element (7, 37, 37") is retractable within the probe means (5) by an operating member (41, 43) extending through the undercarriage (11).

11. The harpoon device according to claim 1, wherein an angle (A) between the center line (CL) of the undercarriage (11) and the prolongation of a hook element (37") of the securing element (4) is about 15-25 degrees, preferably 10-30 degrees, which center line (CL) is oriented substantially perpendicular to the ground (15) during said contact with the ground (15) and when the hook element (37") is extended for said securing of the aerial vehicle (31, 55).

12. An undercarriage of an aerial vehicle (31, 55), wherein the undercarriage (11) comprises the harpoon device (1) according to claim 1.

* * * * *